(12) United States Patent
Deguchi

(10) Patent No.: US 6,918,687 B2
(45) Date of Patent: Jul. 19, 2005

(54) LEVELING APPARATUS FOR VEHICLE HEADLAMP

(75) Inventor: Hirohisa Deguchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/447,061

(22) Filed: May 28, 2003

(65) Prior Publication Data

US 2003/0223242 A1 Dec. 4, 2003

(30) Foreign Application Priority Data

May 30, 2002 (JP) .................................... P.2002-157466

(51) Int. Cl.$^7$ ........................ F21V 21/26; B60Q 1/076
(52) U.S. Cl. .................. 362/463; 362/273; 362/289; 362/524; 362/526; 362/513
(58) Field of Search ................................ 362/463, 460, 362/270–273, 286–289, 386, 465, 468, 524, 526, 513

(56) References Cited

U.S. PATENT DOCUMENTS

| 4,574,334 A | * 3/1986 | Igura ........................... 362/515 |
| 5,823,054 A | * 10/1998 | Brouwer ....................... 74/425 |
| 6,428,196 B1 | 8/2002 | Deguchi et al. |

FOREIGN PATENT DOCUMENTS

GB     2 355 065 A     4/2001

* cited by examiner

*Primary Examiner*—Stephen Husar
*Assistant Examiner*—Guiyoung Lee
(74) *Attorney, Agent, or Firm*—Fish & Richardson P.C.

(57) ABSTRACT

A leveling apparatus for a vehicle headlamp has a case body, a motor disposed within the case body, a worm wheel supported by the case body rotatably but unmovably in the longitudinal direction and rotated by the motor and a shaft screwed into the worm wheel. The shaft and the worm wheel are screwed together by thread ridges provided on the inner side of the worm wheel and thread ridges provided on the outer periphery of a driven portion forming the shaft. The thread ridges on one side out of the thread ridges on two sides are formed by one to two pitches.

3 Claims, 9 Drawing Sheets

LEVELING APPARATUS FOR VEHICLE HEADLAMP

BACKGROUND OF THE INVENTION

1. Field of the Invention

The present invention relates to a novel leveling apparatus for a vehicle headlamp. More particularly, the present invention relates to providing a leveling apparatus unaffected by ambient temperature and ambient humidity.

2. Description of the Related Art

A leveling apparatus is provided with a drive source such as a motor, which may be remotely controlled by a driver or automatically driven. When driving the drive source, a tiltable member for changing the direction of irradiation of the headlamp, such as a reflector supporting a light source or a lamp body containing the light source and the reflector, is tilted.

FIGS. 8 and 9 show an example of a conventional leveling apparatus for a vehicle headlamp.

A leveling apparatus has a case body b in which a motor c is contained. A worm wheel d is disposed within the case body b rotatably but unmovably in the longitudinal direction and a tapped hole e is provided in the worm wheel d. A worm gear f is engaged with the worm wheel d and rotated by the motor c via reduction gears g. When the worm gear f is rotated, the worm wheel d is rotated.

The leveling apparatus has a shaft h axially moved as the worm wheel d rotates. The shaft h is in the form of a spindle having a threaded portion i, a slide support portion j and a spherical body k. The slide support portion j is non-circular in traverse cross section and passed through a non-circular through-hole 1 formed in the front end portion of the case body b, whereby the slide support portion j is movable back and forth though not rotatable.

The threaded portion i of the shaft h is screwed into the tapped hole e of the worm wheel d and when the worm wheel d is rotated, the thread ridges n formed on the threaded portion i of the shaft h are fed axially by the thread ridges m formed inside the tapped hole e of the worm wheel d, so that the shaft h is moved in the axial direction.

The leveling apparatus is supported by a fixing member having fixed relations with a vehicle body and a tiltable member such as a lamp body or the like so that the axial direction of the shaft h substantially conforms to a direction along the longitudinal direction. The spherical body k provided at the front end of the shaft h is coupled to the tiltable member like a reflector or the lamp body.

When the motor c is driven under remote control or automatically as described above, the worm wheel d is rotated and the shaft h is moved back and forth in agreement with the rotational direction of the worm wheel d and then the part coupled to the front (fore) end of the shaft h out of the whole part of the tiltable member is displaced back and forth, whereby the tiltable member is tilted so as to change the direction of irradiation of the headlamp.

A problem with the conventional leveling apparatus a for a vehicle headlamp as described above arises from the fact that because the thread ridges m of the worm wheel d together with the thread ridges n of the shaft h are formed over several pitches, generally over the range of five to eight pitches (see FIG. 9(a)), a change in torque (hereinafter called the required torque) applied to rotating the worm wheel d becomes conspicuous because of a change in temperature as well as humidity.

If two members are screwed together to effect the output transmission, some play is needed between the adjoining thread ridges to assure that the relative movements of one member over the other are rendered smooth. However, a backlash is produced between the two members when the play is too large and the positional accuracy may deteriorate.

In the leveling apparatus a, the play between the thread ridges m of the worm wheel d and the thread ridges n of the shaft h is set at 0.05 mm or less.

Notwithstanding, if the play is set too small with the thread ridges m and n on two sides staying in mesh over several pitches with their dimensions growing greater as the temperature rises, an accumulation of dimensional errors produced therebetween results in tightening the intermeshing of the thread ridges m and n on two sides (see FIG. 9(b)). Furthermore, the load applied to the motor c and the reduction gears g may increase because of an increase in the required torque. This problem appears notable particularly when the worm wheel d and the shaft h are made of resin materials. If the materials of both the worm wheel d and the shaft h are changed because of wear resistance and transmission efficiency, the problem above also may appear conspicuous because of the difference in linear expansion coefficient. If one of the materials has water absorption properties such as nylon in particular, expansion by water absorption will result and the load applied to the motor c may become considerably greater.

If errors in pitch are produced between the thread ridges m and n on two sides, error accumulates as the number of pitches meshing together grows larger. Then, the intermeshing of the thread ridges m and n on two sides is tightened. The problem in this case is that the required torque increases.

SUMMARY OF THE INVENTION

In a leveling apparatus of the present invention, thread ridges on one side out of the thread ridges on two sides are formed by one to two pitches.

That is, the thread ridges on two sides always mesh together by one to two pitches. As a result, the leveling apparatus is prevented from being affected by ambient temperature and humidity.

Figure 9:
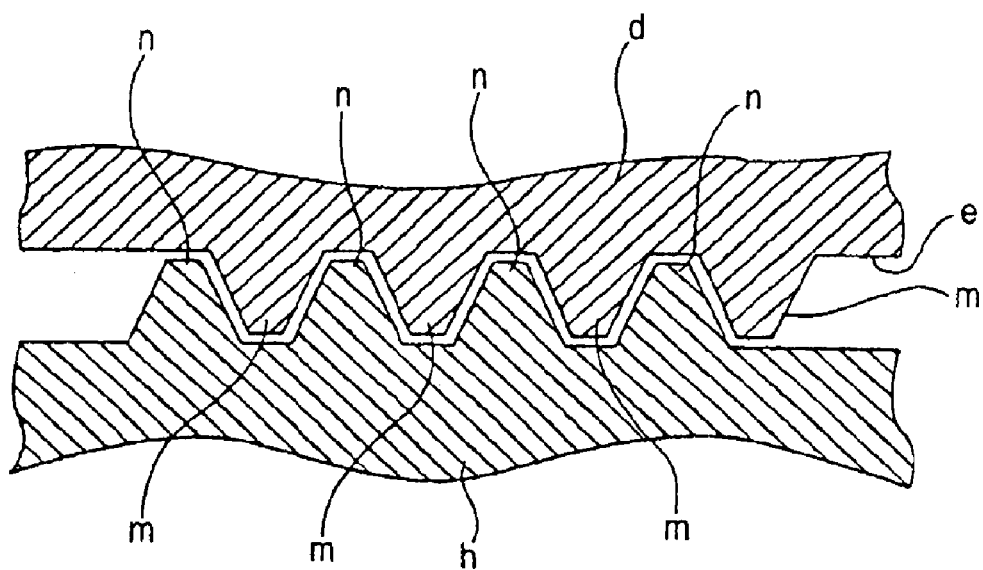
FIGS. 9(a) and 9(b) are enlarged views of portions where a worm wheel meshes with a shaft mesh. Specifically, FIG.
Figure 9:
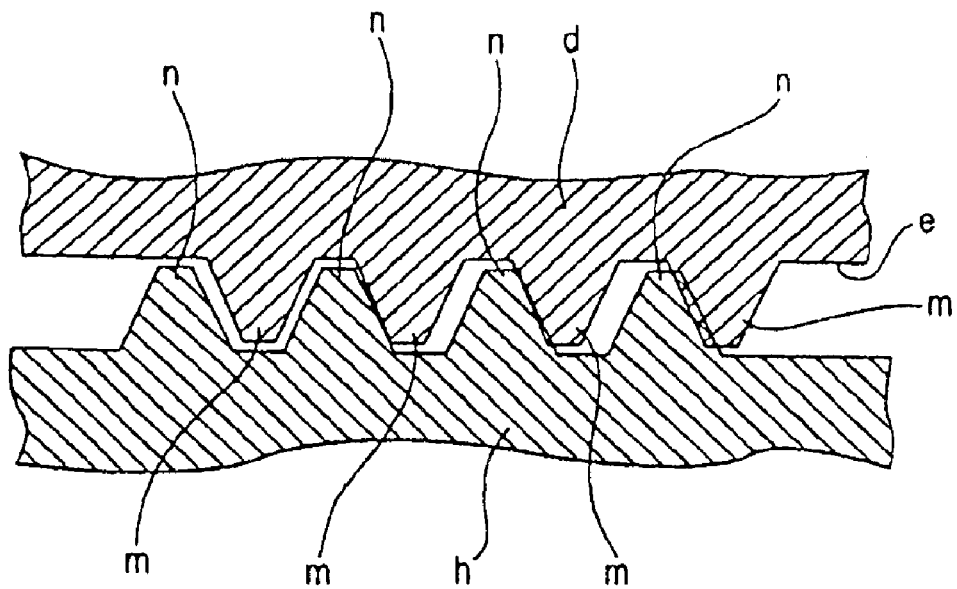

9(*a*) shows a normal meshing condition, and FIG. 9(*b*) shows a condition in which a dimensional error is produced.

DETAILED DESCRIPTION OF THE PREFERRED EMBODIMENTS

A leveling apparatus for a vehicle headlamp will now be described in detail with reference to the accompanying drawings.

FIGS. 1 to 4 show a leveling apparatus for a vehicle headlamp.

Figure 1:
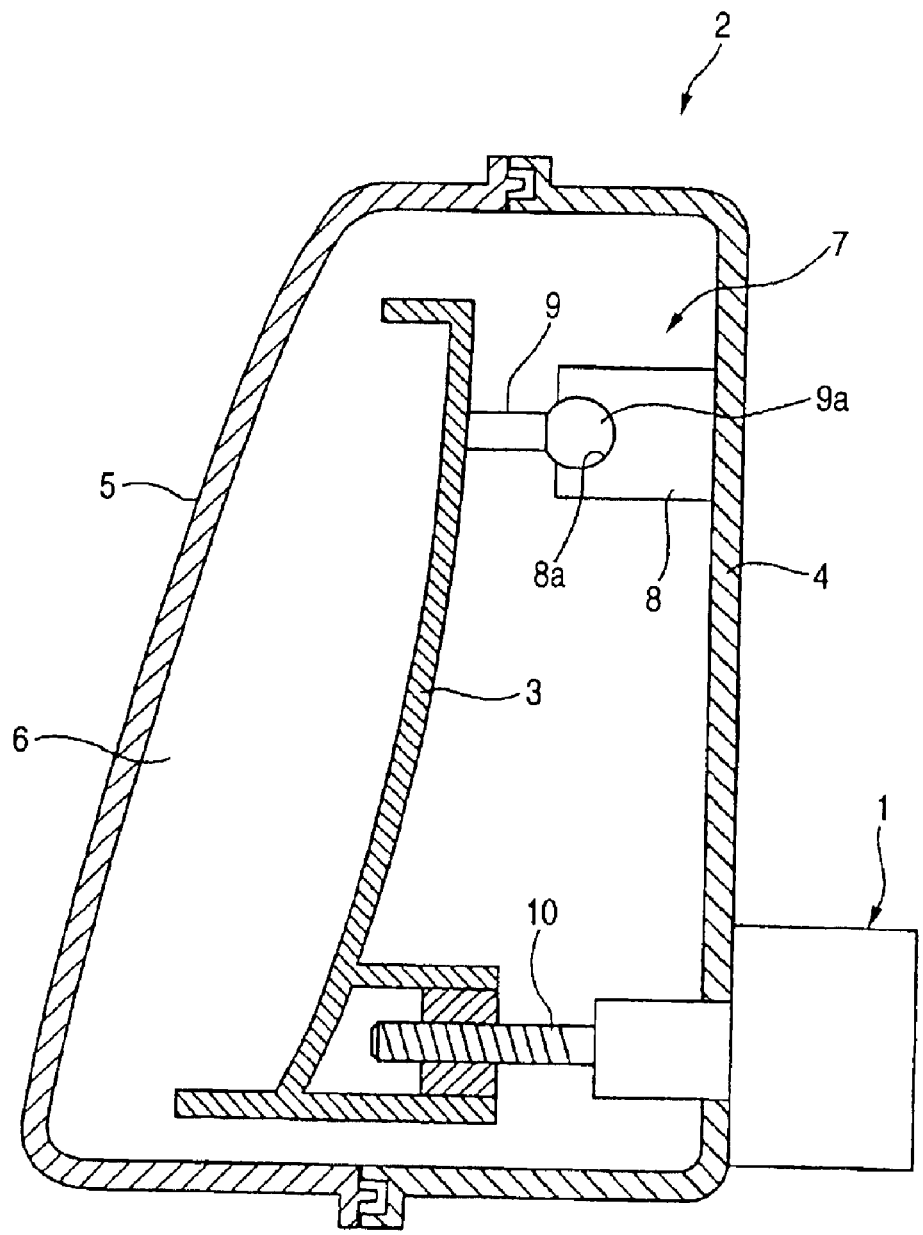
FIG. 1 shows a leveling apparatus for a vehicle headlamp as an embodiment of the invention and is a schematic sectional view of a vehicle headlamp.

A vehicle headlamp having a leveling apparatus 1 is shown in FIG. 1.

The vehicle headlamp 2 is a movable reflector type headlamp, and a reflector 3 is equivalent to a tiltable member. The direction of irradiation of the vehicle headlamp 2 is changed by tilting the reflector 3.

The front opening of a lamp body 4 having a depressed portion with its front opened is covered with a lens 5, and the reflector 3 is tiltably disposed within a partition for use as a lamp chamber 6 formed with the lamp body 4 and the lens 5.

The reflector 3 is supported by the lamp body 4 at two places in the upper end portion and at one place in the lower end portion. One of the two places in the upper end portion of the reflector 3 is supported by the lamp body 4 via a pivotal fulcrum portion 7. The pivotal fulcrum portion 7 is arranged such that a spherical portion 9*a* formed at the rear end of a shaft 9 projecting backward from the upper end portion of the reflector 3 is pivotably fitted into a spherical concave portion 8*a* formed in the receiver portion 8 projecting from the rear inner surface of the lamp body 7.

The upper end portion of the reflector 3 is supported by the lamp body 4 at one more place (not shown) via a space adjusting portion. The space adjusting portion includes an adjusting shaft rotatably supported by the rear end portion of the lamp body 3 and a nut body supported by the reflector 3. The threaded portion of the adjusting shaft screws into the nut body. As the threaded portion of the adjusting shaft is screwed in or out by turning the adjusting shaft, the nub body is moved back and forth along the adjusting shaft. Thus, the portion used to support the nut body of the reflector is also moved back and forth.

A part situated below the pivotal fulcrum portion 7 out of the lower end portion of the reflector 3 is supported by the lamp body 4 via the leveling apparatus 1.

The leveling apparatus 1 has a shaft 10 moving back and forth, and the front end portion of the shaft 10 is coupled to the reflector 3. When the shaft 10 is moved back and forth, the part coupled to the shaft 10 of the reflector 3 is moved back and forth, whereby the reflector 3 is tilted upward and downward with a line connecting the two places of the upper end portion supported by the lamp body 4 as an axis of rotation. Thus, the direction of irradiation of the headlamp is vertically changed.

A light source (not shown) is supported by the reflector 3.

FIG. 1 shows that the reflector 3 is used as an tiltable member by way of an example. However, If any component part other than a reflector is employed as such a tiltable member in a vehicle headlamp having a leveling apparatus. For example, a frame for supporting one or more than one reflector is tiltably disposed within a lamp chamber to change the direction of irradiation by tilting the frame. Otherwise, a reflector is disposed within a partition for use as a lamp chamber formed with a lamp body and a lens. The lamp body, then, is tiltably supported by a vehicle body, and the reflector is tilted simultaneously by tilting the lamp body to change the direction of irradiation.

Figure 2:
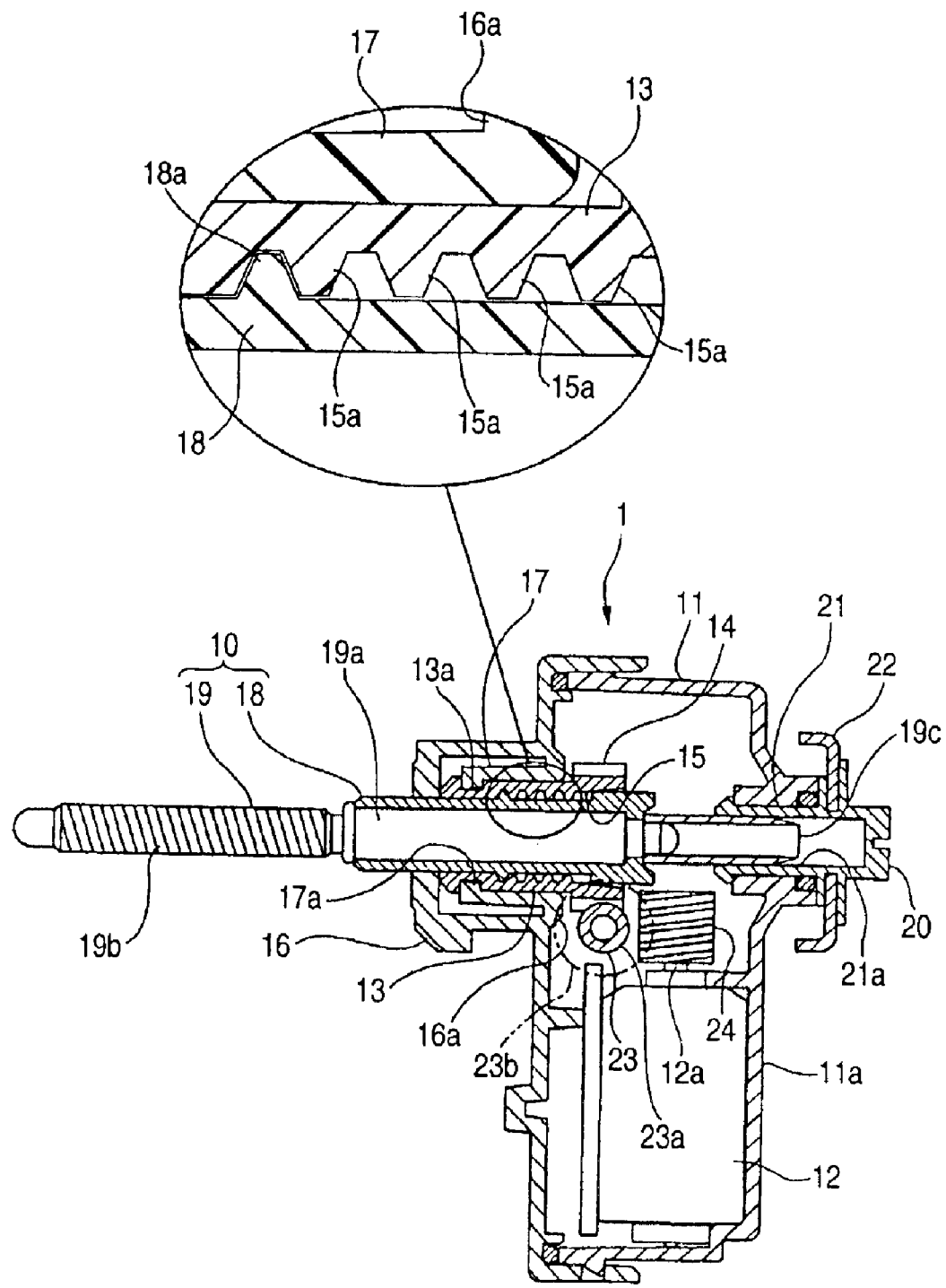
FIG. 2 is a vertical sectional view of the leveling apparatus.
Figure 3:
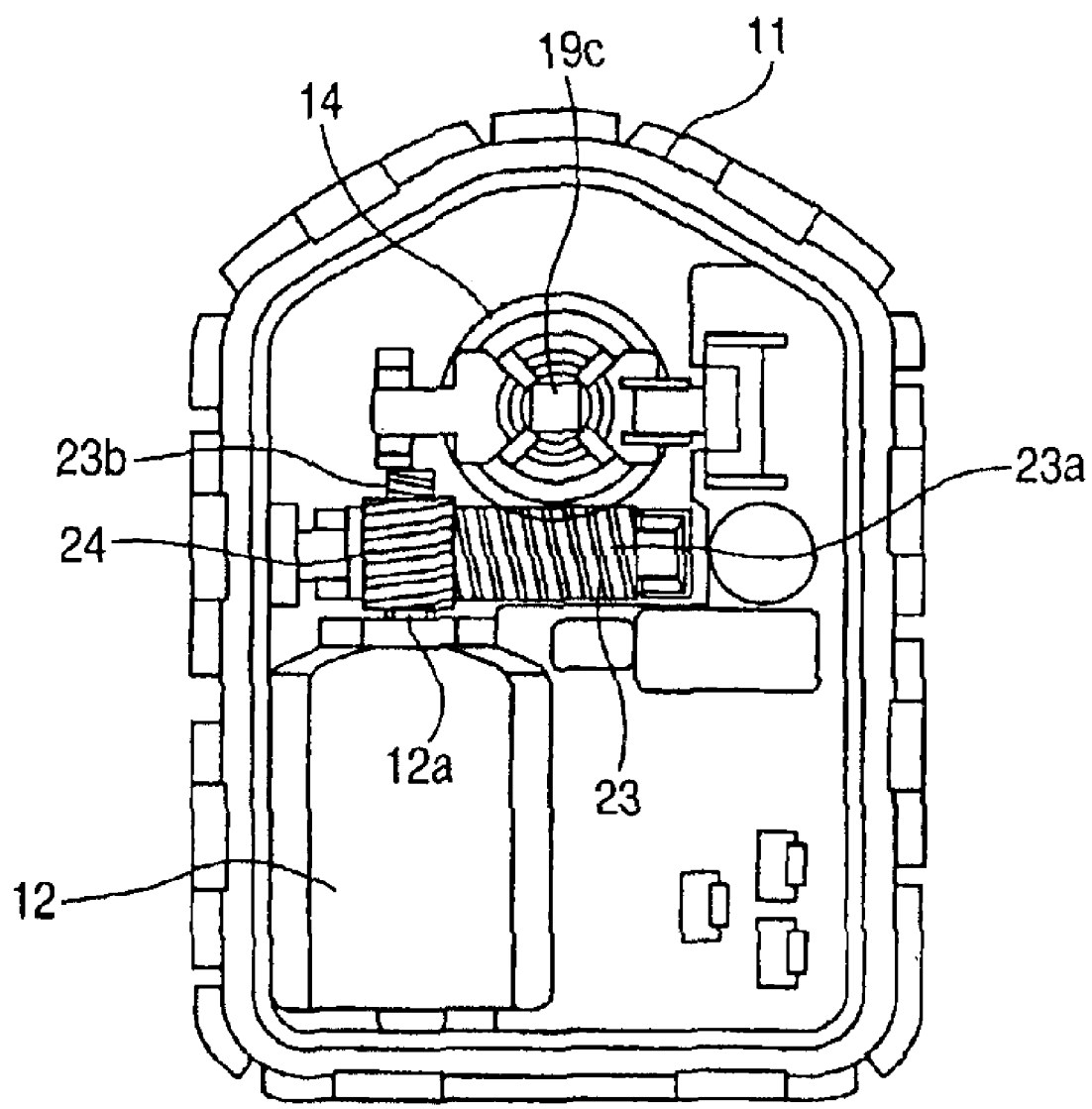
FIG. 3 is a rear view of a case body with its back side removed.
Figure 4:
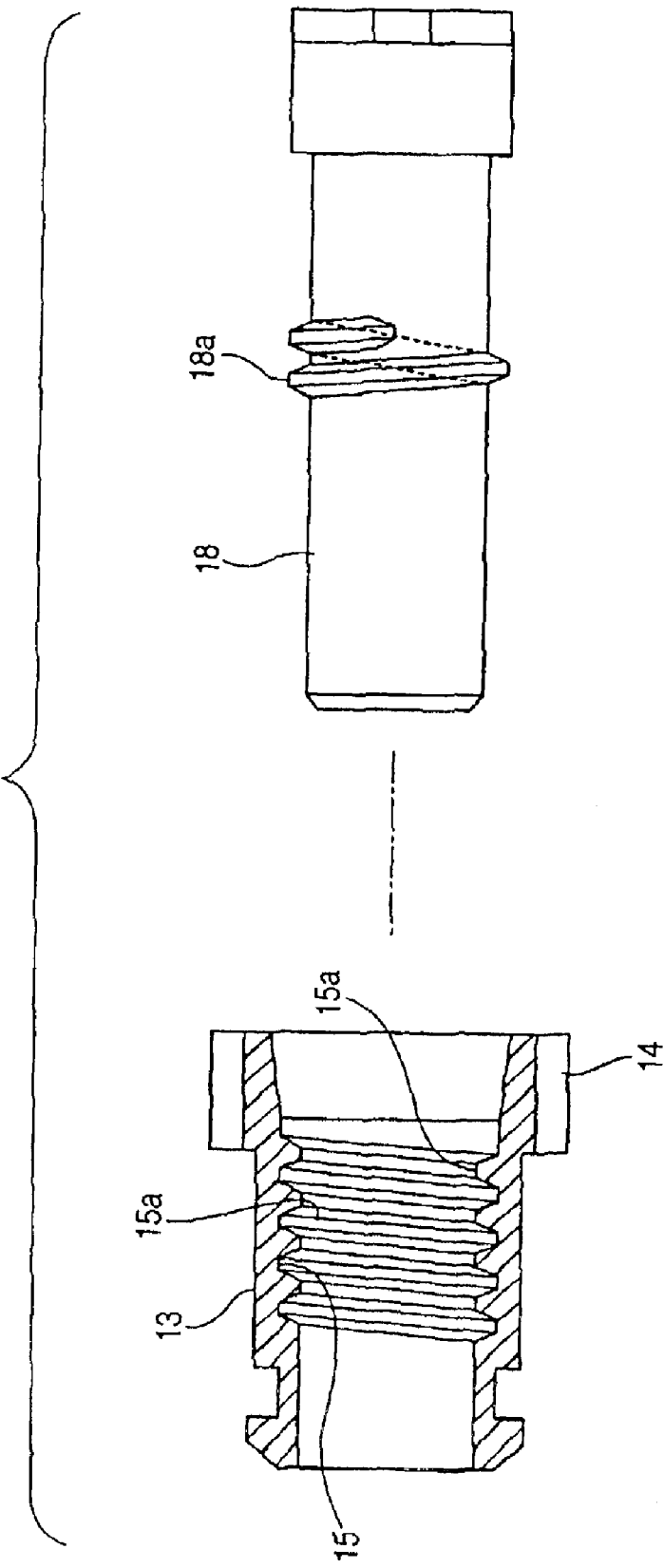
FIG. 4 is a sectional view of a worm wheel and a shaft with part of it separated.

The leveling apparatus 1 will now be described in detail with reference to FIGS. 2 to 4.

The leveling apparatus 1 is provided with a case body 11, and other members such as a motor 12 are disposed within the case body 11 together with the shaft 10 supported therein.

A worm wheel 13 is disposed within the case body 11 rotatably but unmovably in the longitudinal direction. The whole worm wheel 13 is substantially in the form of a longitudinally-long cylinder and has a wheel portion 14 projecting from its rear end portion. The internal space of the worm wheel 13 is formed into a tapped hole 15 with thread ridges 15*a* formed over several pitches, for example, five to eight pitches. A slide groove 13*a* extends over the whole outer peripheral face of the front end portion of the worm wheel 13.

A cylindrical support portion 16 protrudes forward further from the front of the case body 11. An inner flange 16*a* protrudes inward and is formed in the base portion of the support portion 16. An outer peripheral face on the front side, slightly protruding forward from the wheel portion 14 of the worm wheel 13, is rotatably support by the inner peripheral edge of the inner flange 16*a*. Further, a cylindrical portion 17 projectes forward from the front of the inner flange 16*a* and is formed within the support portion 16. A projected mating track 17*a* projects inward and is formed at the front end of the cylindrical portion 17. The projected mating track 17*a* is slidably mated with the slide groove 13*a* formed in the outer peripheral face in the front end portion of the worm wheel 13. Thus the worm wheel 13 is supported by the case body 11 rotatably but unmovably in the longitudinal direction.

The shaft 10 is disposed to pass through the worm wheel 13. The shaft 10 has a driven portion 18 screwed into the worm wheel 13 and an adjusting shaft 19 rotatably supported by the driven portion 18. The driven portion 18 is substantially cylindrical and provided with thread ridges 18*a* formed close to the rear end of the outer peripheral face of the driven portion 18. The thread ridges 18*a* are formed by one to two pitches. In other words, if the thread ridges 18*a* are formed at less than one pitch, a portion may be produced without any thread ridge as seen from the circumferential direction. Consequently, the shaft 10 and the worm wheel 13 may not screw together. On the other hand, if the thread ridges 18*a* are formed at more than two pitches, a greater torque may be needed. Thus, the length of the thread ridge 18*a* is limited to one to two pitches. The thread ridges 18*a* of the driven portion 18 shown in the drawing are formed at approximately 1.2 pitches (see FIG. 4). The adjusting shaft 19 is formed longer in the longitudinal direction. A supported portion 19*a* as an intermediated portion, a threaded shaft portion 19*b* extending forward from the front end of the supported portion 19*a* and a coupling portion 19*c* extending backward from the rear end of the supported portion 19*a* are formed integrally. The supported portion 19*a* of the adjusting shaft 19 are substantially columnar and supported by the driven portion 18 rotatably but unmovably in the longitudinal direction with the driven portion 18 passed therethrough. The coupling portion 19*c* is substantially rectangular in traverse cross section (see FIG. 3).

An operating body 20 is rotatably supported in a position opposite to the rear end of the adjusting shaft 19 on the rear side wall 11*a* of the case body 11. The operating body 20 has a coupling cylindrical portion 21 and a crown gear portion 22 fixed to the rear end portion of the coupling cylindrical portion 21. The first-half of the coupling cylindrical portion 21, which is rectangular in transverse cross section, is positioned within the case body 11 and has a coupling hole 21a opening forward. The crown gear portion 22 is positioned to face the rear side wall 11a of the case body 11 from behind.

The coupling portion 19c of the adjusting shaft 19 is inserted into the coupling hole 19a of the coupling cylindrical portion 21. The adjusting shaft 19 together with the operating body 20 is movable back and forth but mutually unrotatable.

A transmission gear body 23 is rotatably disposed within the case body 11. The transmission gear body 23 has a worm gear 23a and a worm wheel 23b integrally formed in one end portion of the worm gear 23a. The worm gear 23a is engaged with the wheel portion 14 of the worm wheel 13 and the worm wheel 23b is engaged with a worm gear 24 fixed to the rotary shaft 12a of the motor 12.

The threaded portion 19b of the adjusting shaft 19 is screwed into the nut body supported by the reflector, for example.

When the motor 12 is activated in the leveling apparatus 1 above, the worm wheel 13 is rotated via the worm gear 24 and the transmission gear body 23. When the worm wheel 13 is rotated, the thread ridges 18a of the driven portion 18 of the shaft 10 are fed by the thread ridges 15a of the worm wheel 13. Consequently, the driven portion 18 is moved back and forth and the adjusting shaft 19 supported by the driven portion 18 is also moved back and forth. Then the portion coupled to the threaded shaft portion 19b of the adjusting shaft 19 out of the tiltable member is moved back and forth, whereby the tiltable member is tilted and the direction irradiation is changed.

As the adjusting shaft 19 can be rotated by rotating the operating body 20 in the leveling apparatus 1 above, the tiltable member used to support the nut body can be tilted by rotating the adjusting shaft 19 by rotating the crown gear portion 22 with a suitable jig and then by screwing the threaded shaft portion 19b into or out of the nut body supported by the tiltable member.

Because the thread ridges 18a of the shaft 10 meshing with the thread ridges 15a of the worm wheel 13 are formed by one to two pitches, an accumulation of dimensional errors due to changes in temperature, humidity and so forth does not affect the leveling apparatus 1. Moreover, even though play between the thread ridges 15a and 18a on two sides is decreased as much as possible, smooth operation is not impeded by changes in temperature, humidity and so forth.

Figure 5:
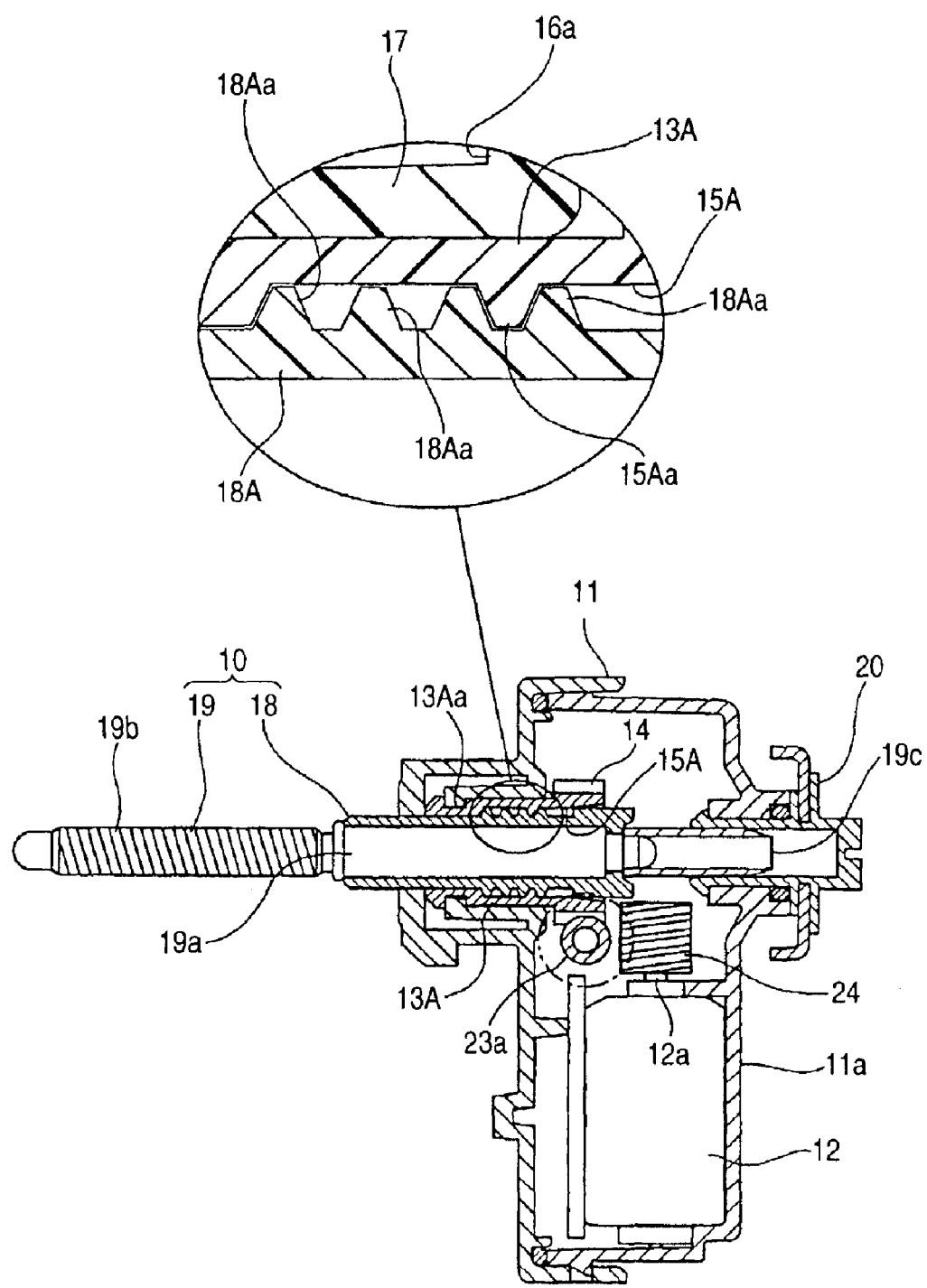
FIG. 5 is a vertical sectional view of the principal part of another embodiment of the invention.

FIG. 5 shows another example of the first embodiment of the invention.

This example is different from the above first embodiment of the invention in that a worm wheel is used as a member with thread ridges formed by one to two pitches. As for the rest, both the embodiments thereof are similar in arrangement. Therefore, only the different features will be described in detail with illustration.

Thread ridges 15Aa by one to two pitches are formed inside the tapped hole 15A of a worm wheel 13A.

Thread ridges 18Aa are formed on the outer peripheral face of the driven portion 18A of a shaft 10A, the thread ridges 18Aa being formed over several pitches, for example, at five to eight pitches.

Also in this example of the leveling apparatus, because the thread ridges 15Aa formed on the worm wheel 13A and the thread ridges 18Aa formed on the shaft 10A always mesh together by one to two pitches, an accumulation of dimensional errors because of changes in temperature, humidity and so forth does not affect the leveling apparatus. Furthermore, even though play between the thread ridges 15Aa and 18Aa on two sides is decreased as much as possible, smooth operation is not impeded by changes in temperature, humidity and so forth.

Figure 6:
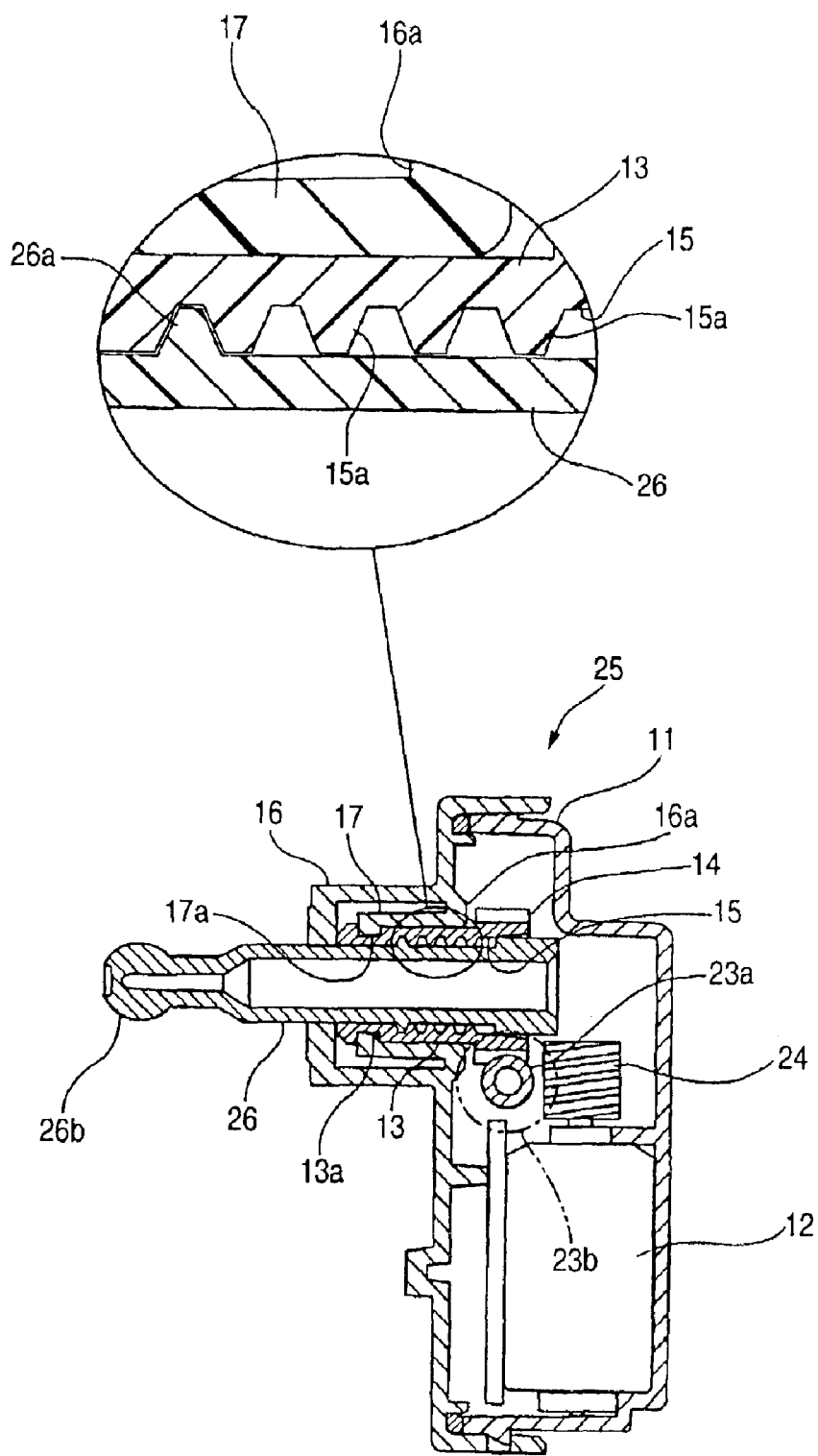
FIG. 6 is a vertical sectional view of a leveling apparatus for a vehicle headlamp as another embodiment of the invention.

FIG. 6 shows a leveling apparatus for a vehicle headlamp as a second embodiment of the invention. The shaft in the second embodiment of the invention is different from what is described in the first embodiment thereof. As for the rest, including of the worm wheel, both the embodiments thereof are similar in arrangement. Therefore, only the different features will be described in detail with illustration.

The shaft 26 of a leveling apparatus 25 is formed as a single member. The shaft 26 is in the form of a long shaft in the longitudinal direction and thread ridges 26a are formed by one to two pitches on the outer peripheral face of the rear end portion. A spherical body 26b is formed at the front end of the shaft 26. The substantially first half portion of the shaft 26 projects from the front end of the support portion 16 of the case body 11 with the tapped hole 15 of worm wheel 13 inserted through the shaft 26. The shaft 26 is made movable back and forth but unrotatable with respect to the case body 11. Although, a means for setting the relation between the shaft 26 and the case body 11 as defined above is not shown, use can be made of any proper mating means for making a key provided in the case body 11 slidable in a key groove provided in the shaft 26. Moreover, the thread ridges 26a of the shaft 26 are engaged with the thread ridges 15a of the worm wheel 13. When the motor 12 is driven to rotate the worm wheel 13, the thread ridges 26a of the shaft 26 are fed by the thread ridges 15a of the worm wheel 13, whereby the shaft 26 is moved back and forth.

The spherical body 26b formed at the front end of the shaft 26 is pivotably fitted in the spherical concave portion of a sphere receiving body provided in a mating member such as a reflector. Consequently, a tiltable member is vertically tilted by the shaft 26 moving back and forth when the leveling apparatus 25 is driven.

Also in the leveling apparatus 25 according to the second embodiment of the invention, because the thread ridges 15a formed on the worm wheel 13 and the thread ridges 26a formed on the shaft 26 always mesh together by one to two pitches, an accumulation of dimensional errors because of changes in temperature, humidity and so forth does not affect the leveling apparatus. Furthermore, even though play between the two thread ridges 15a and 26a is decreased as much as possible, smooth operation is not impeded by changes in temperature, humidity and so forth.

Figure 7:
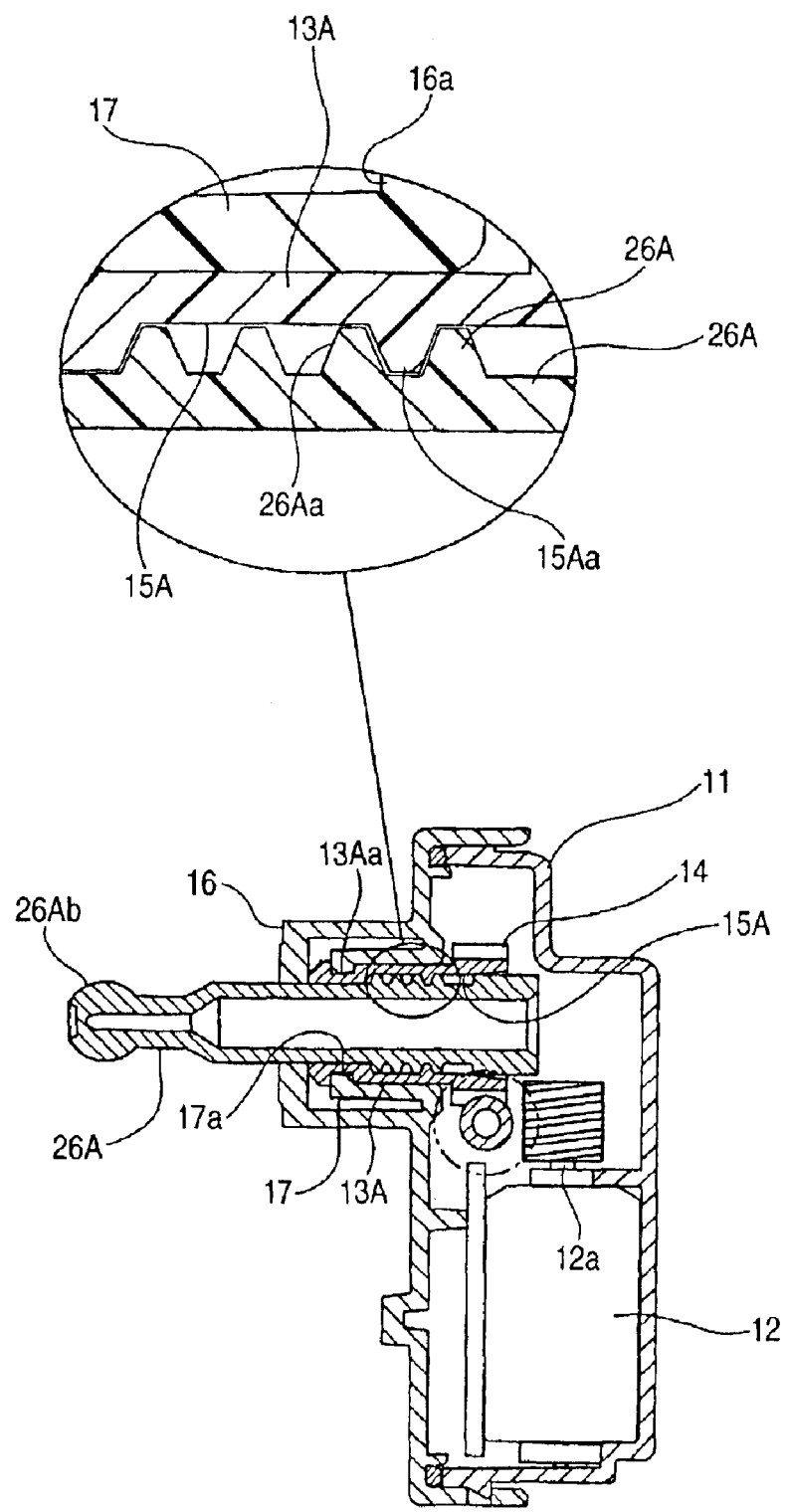
FIG. 7 is a vertical sectional view of the principal part of still another embodiment of the invention.
Figure 8:
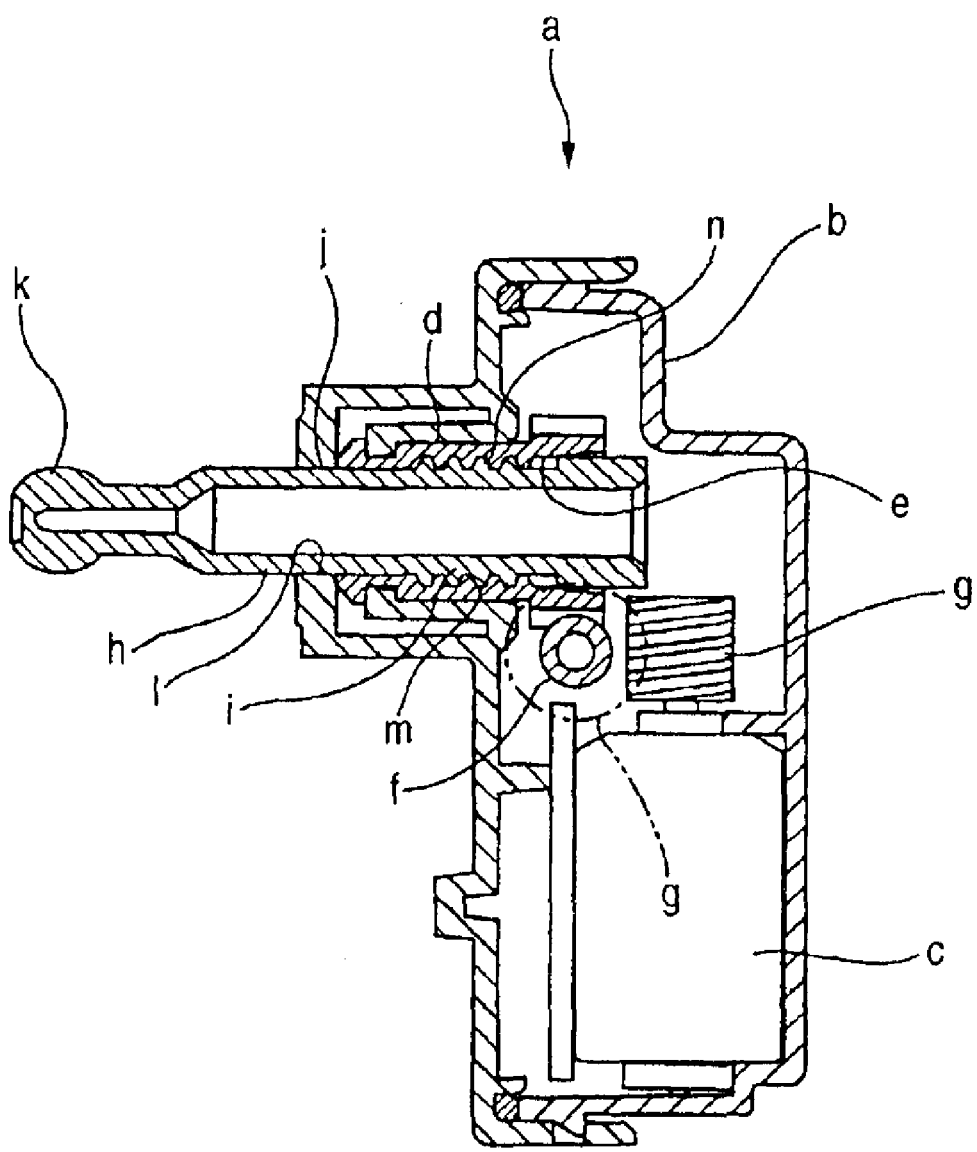
FIG. 8 shows a vertical sectional view of a conventional leveling apparatus for a vehicle headlamp.

FIG. 7 shows another example of the second embodiment of the invention. This example is different from the above second embodiment of the invention in that a worm wheel is used as a member with thread ridges formed by one to two pitches. As for the rest, this example is similar in arrangement to the second or first embodiments. Only the different features will be described in detail with illustration.

The thread ridges 15Aa by one to two pitches are formed inside the tapped hole 15A of the worm wheel 13A.

Thread ridges 26Aa are formed on the outer peripheral face of in the rear end portion of a shaft 26A, the thread ridges 26Aa being formed over several pitches, for example, five to eight pitches.

Also in this example of the leveling apparatus, because the thread ridges 15Aa formed on the worm wheel 13A and the thread ridges 26Aa formed on the shaft 26 always mesh together by one to two pitches, an accumulation of dimensional errors because of changes in temperature, humidity and so forth does not affect the leveling apparatus. Furthermore, even though play between the thread ridges 15Aa and 26Aa on two sides is decreased as much as possible, smooth operation is not impeded by changes in temperature, humidity and so forth.

The configurations and the structure shown in the above embodiments of the invention represent examples for implementing the invention. These examples are provided to illustrate and not limit the scope of the invention.

In summary, the leveling apparatus for a vehicle headlamp comprises a case body, a motor disposed within the case body, a worm wheel supported by the case body rotatably but unmovably in the longitudinal direction and rotated by the motor and a shaft screwed into the worm wheel. The shaft and the worm wheel are screwed together by the thread ridges provided on the inner side of the worm wheel and the thread ridges provided on the outer periphery of the shaft. The thread ridges on one side out of the thread ridges on two sides are formed by one to two pitches.

Therefore, because the thread ridges on two sides always mesh together by one to two pitches, an accumulation of dimensional errors between the thread ridges on two sides because of changes in temperature, humidity and so forth does not to affect the leveling apparatus. Furthermore, even though play between the thread ridges on two sides is decreased as much as possible, smooth operation is not impeded by changes in temperature, humidity and so forth.

Dimensional variations because of changes in temperature and humidity have a large impact as the worm wheel and the shaft are made of resin. The effect of applying the invention to the leveling apparatus is large because an accumulation of dimensional errors is substantially absent. Moreover, the worm wheel and the shaft can be formed into intricate shapes but, at the same time, lightweight and less costly.

The present invention claims priority from Japanese patent application serial no. 2002-157466 filed on May 30, 2002, which is incorporated by reference herein in its entirety.

Several embodiments of the invention have been described herein, but it should be understood that various additions and modifications could be made which fall within the scope of the following claims.

What is claimed is:

1. A leveling apparatus for a vehicle headlamp, comprising:

a case body, a motor disposed within the case body, a worm wheel rotatably supported by the case body, wherein the worm wheel's position is fixed in the longitudinal direction and wherein, during operation, the worm wheel is rotated by the motor, a shaft screwed into the worm wheel, wherein the shaft and the worm wheel are screwed together by thread ridges provided on an inner side of the worm wheel and thread ridges provided on an outer periphery of the shaft; and wherein the thread ridges on at least one of the shaft and the worm wheel are formed by one to two pitches.

2. The leveling apparatus for a vehicle headlamp as claimed in claim 1, wherein the worm wheel and the shaft are made of resin.

3. The leveling apparatus for a vehicle headlamp as claimed in claim 1, wherein a plurality of thread ridges are provided over the inner side of the work wheel, and one to two pitches of the thread ridges are provided on the outer periphery of the shaft.

* * * * *